US012563656B2

(12) United States Patent
Preston

(10) Patent No.: US 12,563,656 B2
(45) Date of Patent: Feb. 24, 2026

(54) BEAM ANGLE MATCHING FOR MULTI-COLOR FIXTURES

(71) Applicant: SIGNIFY HOLDING B.V., Eindhoven (NL)

(72) Inventor: James William Preston, Westford, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 33 days.

(21) Appl. No.: 18/724,657

(22) PCT Filed: Dec. 15, 2022

(86) PCT No.: PCT/EP2022/086230
§ 371 (c)(1),
(2) Date: Jun. 27, 2024

(87) PCT Pub. No.: WO2023/126203
PCT Pub. Date: Jul. 6, 2023

(65) Prior Publication Data

US 2025/0071875 A1 Feb. 27, 2025

Related U.S. Application Data

(60) Provisional application No. 63/295,614, filed on Dec. 31, 2021.

(30) Foreign Application Priority Data

Jan. 17, 2022 (EP) .................................... 22151724

(51) Int. Cl.
*H05B 47/155* (2020.01)
*H05B 45/20* (2020.01)
*H05B 47/18* (2020.01)

(52) U.S. Cl.
CPC ........... *H05B 47/155* (2020.01); *H05B 45/20* (2020.01); *H05B 47/184* (2024.01)

(58) Field of Classification Search
CPC ..... H05B 47/155; H05B 45/20; H05B 47/184
See application file for complete search history.

(56) References Cited

U.S. PATENT DOCUMENTS

| | | | |
|---|---|---|---|
| 10,018,326 | B2 | 7/2018 | Mayer et al. |
| 2005/0093427 | A1 | 5/2005 | Wang et al. |

(Continued)

FOREIGN PATENT DOCUMENTS

| | | | |
|---|---|---|---|
| JP | 5881415 | B2 | 3/2016 |

*Primary Examiner* — Minh Tran

(57) ABSTRACT

A method of controlling light beam angles of light beams provided by a light fixture includes obtaining a narrowest and a widest beam angle values of a beam angle of a first light beam provided by a first cluster of LED-optics units and obtaining a narrowest and a widest beam angle values of a beam angle of a second light beam provided by a second cluster of LED-optics units. The method also includes controlling the first and second clusters of LED-optics units such that the beam angles of the first light beam and the second light beam are bound by a smaller one of the narrowest beam angle values of the beam angles of the first light beam and the second light beam and by a smaller one of the widest beam angle values of the beam angles of the first light beam and the second light beam.

15 Claims, 7 Drawing Sheets

(56) References Cited

U.S. PATENT DOCUMENTS

| | | | | |
|---|---|---|---|---|
| 2015/0009677 | A1* | 1/2015 | Catalano | H01L 24/24<br>362/296.07 |
| 2016/0298813 | A1* | 10/2016 | Jurik | F21V 7/0091 |
| 2019/0113339 | A1 | 4/2019 | Nolan et al. | |

* cited by examiner

BEAM ANGLE MATCHING FOR MULTI-COLOR FIXTURES

CROSS-REFERENCE TO PRIOR APPLICATIONS

This application is the U.S. National Phase application under 35 U.S.C. § 371 of International Application No. PCT/EP2022/086230, filed on Dec. 15, 2022, which claims the benefit of U.S. Provisional Patent Application No. 63/295,614, filed on Dec. 31, 2021 and European Patent Application No. 22151724.6, filed on Jan. 17, 2022. These applications are hereby incorporated by reference herein.

TECHNICAL FIELD

The present disclosure relates generally to lighting solutions, and more particularly to controlling beam angles in additive lighting systems.

BACKGROUND

In multi-color lighting systems, light beams produced by different light sources of a light fixture may produce a combined light with unwanted light characteristics. For example, light sources of a light fixture may provide two light beams having different colors that result in a combined light, where the two light beams also have different beam angles. In such cases, because the combined light is limited by the narrower of the two light beams, the light beam having the wider beam angle may form an undesirable halo on the outside of the combined beam. Thus, a solution for controlling the beam angles of light beams provided by a light fixture or system may be desired.

SUMMARY

The present disclosure relates generally to lighting solutions, and more particularly to controlling beam angles in additive lighting systems. In an example embodiment, a method of controlling beam angles of light beams provided by a light fixture include obtaining a narrowest beam angle value of a beam angle of a first light beam and a widest beam angle value of the beam angle of the first light beam. A first cluster of LED-optics units provides the first light beam. The method further includes obtaining a narrowest beam angle value of a beam angle of a second light beam and a widest beam angle value of the beam angle of the second light beam, where a second cluster of LED-optics units provides the second light beam. The method further includes controlling the first cluster of LED-optics units and the second cluster of LED-optics units such that the beam angle of the first light beam and the beam angle of the second light beam bound by a larger one of the narrowest beam angle value of the beam angle of the first light beam and the narrowest beam angle value of the beam angle of the second light beam and by a smaller one of the widest beam angle value of the beam angle of the first light beam and the widest beam angle value of the beam angle of the second light beam.

In another example embodiment, a light fixture includes a first cluster of LED-optics units designed to provide a first light beam and a second cluster of LED-optics units designed to provide a second light beam. The light fixture further includes a controller configured to control the first cluster of LED-optics units and the second cluster of LED-optics units such that a beam angle of the first light beam and a beam angle of the second light beam are bound by a larger one of a narrowest beam angle value of the beam angle of the first light beam and a narrowest beam angle value of the beam angle of the second light beam and by a smaller one of a widest beam angle value of the beam angle of the first light beam and a widest beam angle value of the beam angle of the second light beam.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
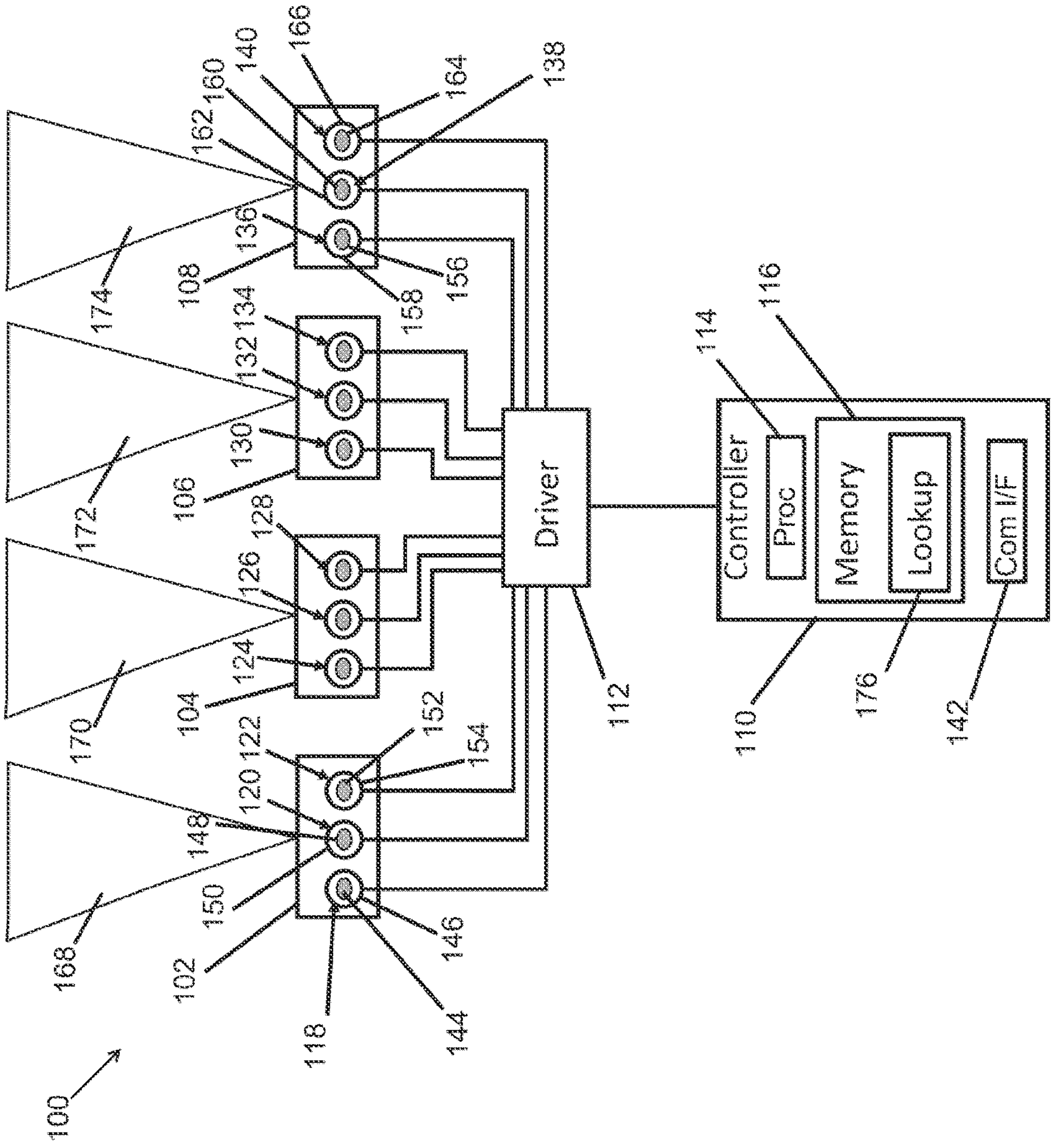
FIG. 1 illustrates a light fixture that provides light beams with controllable beam angles according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a light fixture 100 that provides light beams with adjustable beam angles according to an example embodiment. In some example embodiments, the light fixture 100 includes clusters of LED-optics units 102, 104, 106, 108. The light fixture 100 may also include a controller 110 and a driver 112. The driver 112 may provide power to the clusters of LED-optics units 102-108. For example, the driver 112 may be a driver that provides power compatible with light emitting diodes (LEDs) of the clusters of LED-optics units 102-108. The controller 110 may provide control signals to the driver 112 to control the amount of power that is provided to the clusters of LED-optics units 102-108.

In some example embodiments, the cluster of LED-optics units 102 includes LED-optics units 118, 120, 122. The cluster of LED-optics units 104 may include LED-optics units 124, 126, 128. The cluster of LED-optics units 106 may include LED-optics units 130, 132, 134. The cluster of LED-optics units 108 may include LED-optics units 136, 138, 140. The cluster of LED-optics units 102 may emit a light beam 168, where the beam angle of the light beam 168 may be controllable. The cluster of LED-optics units 104 may emit a light beam 170 having a controllable light beam angle. The cluster of LED-optics units 106 may emit a light beam 172 having a controllable light beam angle. The cluster of LED-optics units 108 may emit a light beam 174 having a controllable light beam angle. At a far field location from the light fixture 100, two or more of the light beams 168-174 may fully overlap each other, for example, on a wall or a floor.

In some example embodiments, the LED-optics unit 118 may include an LED 144 and a secondary optics 146 that covers the LED 144. The LED-optics unit 120 may include an LED 148 and a secondary optics 150 that covers the LED 148. The LED-optics unit 122 may also include an LED 152 and a secondary optics 154 that covers the LED 152. The LEDs 144, 148, 152 may emit lights having the same color. As a non-limiting example, the LEDs 144, 148, 152 may each emit a green light. The secondary optics 146, 150, 154, which may be made from glass, silicone, or another suitable material, may have different lighting distribution characteristics from each other. That is, if the secondary optics 146, 150, 154 are separately used with a light source, the light distributions (i.e., radiation patterns) resulting from the light from the light source passing through the secondary optics 146, 150, 154 are different from each other. The light beam 168 may be an additive light beam that is a combination the lights that are emitted by the LEDs 144, 148, 152 and that passed through the respective one of the secondary optics 146, 150, 154.

In some example embodiments, the LED-optics unit 136 may include an LED 156 and a secondary optics 158 that covers the LED 156. The LED-optics unit 138 may include an LED 160 and a secondary optics 162 that covers the LED 160. The LED-optics unit 140 may include an LED 164 and a secondary optics 166 that covers the LED 164. The LEDs 156, 160, 164 may emit lights having the same color. As a non-limiting example, the LEDs 156, 160, 164 may each emit a white light. The secondary optics 158, 162, 166 may have different lighting distribution characteristics from each other. That is, if the secondary optics 158, 162, 166 are separately used with a light source, the light distributions (i.e., radiation patterns) resulting from the light from the light source passing through the secondary optics 158, 162, 166 are different from each other. The light beam 170 may be an additive light beam that is a combination the lights that are emitted by the LEDs 156, 160, 164 and that passed through the respective one of the secondary optics 158, 162, 166.

In some example embodiments, the LED-optics units 124, 126, 128 may each include an LED and a secondary optics that covers the LED, where the secondary optics of the LED-optics units 124, 126, 128 have different lighting distribution characteristics from each other. The LEDs of the LED-optics units 124, 126, 128 may emit lights having the same color. As a non-limiting example, the LEDs of the LED-optics units 124, 126, 128 may each emit a blue light. The light beam 172 may be an additive light beam that is a combination the lights that are emitted by the LEDs of the LED-optics units 124, 126, 128 and that passed through the respective one of the secondary optics of the LED-optics units 124, 126, 128.

In some example embodiments, the LED-optics units 130, 132, 134 may each include an LED and a secondary optics that covers the LED, where the secondary optics of the LED-optics units 130, 132, 134 have different lighting distribution characteristics from each other. The LEDs of the LED-optics units 130, 132, 134 may emit lights having the same color. As a non-limiting example, the LEDs of the LED-optics units 130, 132, 134 may each emit a red light. The light beam 174 may be an additive light beam that is a combination the lights that are emitted by the LEDs of the LED-optics units 130, 132, 134 and that passed through the respective one of the secondary optics of the LED-optics units 130, 132, 134.

In some example embodiments, the secondary optics included in each one of the clusters of LED-optics units 102-108 may be different from each other and the same among the different clusters of LED-optics units 102-108. To illustrate, the secondary optics 146 of the LED-optics unit 118, the secondary optics 158 of the LED-optics unit 136, and respective secondary optics of the LED-optics units 124, 130 may have the same lighting distribution characteristics. That is, if the secondary optics 146, 158, and the respective secondary optics of the LED-optics units 124, 130 are separately used with a light source, the light distributions (i.e., the radiation patterns) resulting from the light from the light source passing through the secondary optics 146, 158, and the respective secondary optics of the LED-optics units 124, 130 are the same.

In some example embodiments, the secondary optics 150 of the LED-optics unit 120, the secondary optics 162 of the LED-optics unit 138, and respective secondary optics of the LED-optics units 126, 132 may have the same lighting distribution characteristics. That is, if the secondary optics 150, 162, and the respective secondary optics of the LED-optics units 126, 132 are separately used with a light source, the light distributions (i.e., the radiation patterns) resulting from the light from the light source passing through the secondary optics 150, 162, and the respective secondary optics of the LED-optics units 126, 132 are the same.

In some example embodiments, the secondary optics 154 of the LED-optics unit 122, the secondary optics 166 of the LED-optics unit 140, and respective secondary optics of the LED-optics units 128, 134 may have the same lighting distribution characteristics. That is, if the secondary optics 154, 166, and the respective secondary optics of the LED-optics units 128, 134 are separately used with a light source that emits a light, the light distributions (i.e., the radiation patterns) resulting from the light from the light source passing through the secondary optics 154, 166, and the respective secondary optics of the LED-optics units 128, 134 are the same.

In some example embodiments, the controller 110 may include a processor 114 (e.g., a microcontroller or a microprocessor), a memory device 116, and a communication interface unit 142. The communication interface unit 142 may include one or more transmitters and/or receivers that use signals compatible with one or more wireless network standards, such as Bluetooth, Wi-Fi, and/or ZigBee and/or wired communication standard such as Ethernet. Alternatively or in addition, the communication interface unit 142 may include a physical user interface such as a keypad, a dipswitch, a touchscreen, etc.

In some example embodiments, the memory device 116 may include one or more memory devices, such as an EEPROMs, static random access memory device, a flash memory, and/or another type of memory device. Software code and data may be stored in the memory device 116. The processor 114 may execute the software code stored in the memory device 116 to perform operations. For example, a user input received via the communication interface unit 142 of the controller 110 may indicate a desired color, and the controller 110 may control the current provided to the LEDs of the clusters of LED-optics units 102-108 to achieve the desired color light, for example, from one light beam of the light beams 168-174 or a combination of the two or more light beams of the light beams 168-174. The processor 114 may also receive user input via the communication interface unit 142, where the user input indicates a desired beam angle value. The processor 114 may obtain information from the lookup table 176 based on the user input and control the beam angles of the light beams 168-174. For example, the processor 114 may control the amount of current provided by the driver 112 to the LEDs of the clusters of LED-optics units 102-108 based on information in the lookup table 176 stored in the memory device 116. To illustrate, the processor 114 may control the average amounts of current provided by the driver 112 by controlling, for example, the duty cycles of the pulse width modulation (PWM) signals provided by the driver 112 as can be readily understood by those of ordinary skill in the art with the benefit of this disclosure.

In some example embodiments, the information in the lookup table 176 may be generated by characterizing the light beams 168-174 as well as the lights provided by individual LED-optics units of the clusters of LED-optics units 102-108. For example, the ranges of the beam angles of the light beam 168-74 may be different from each other.

Figure 2:
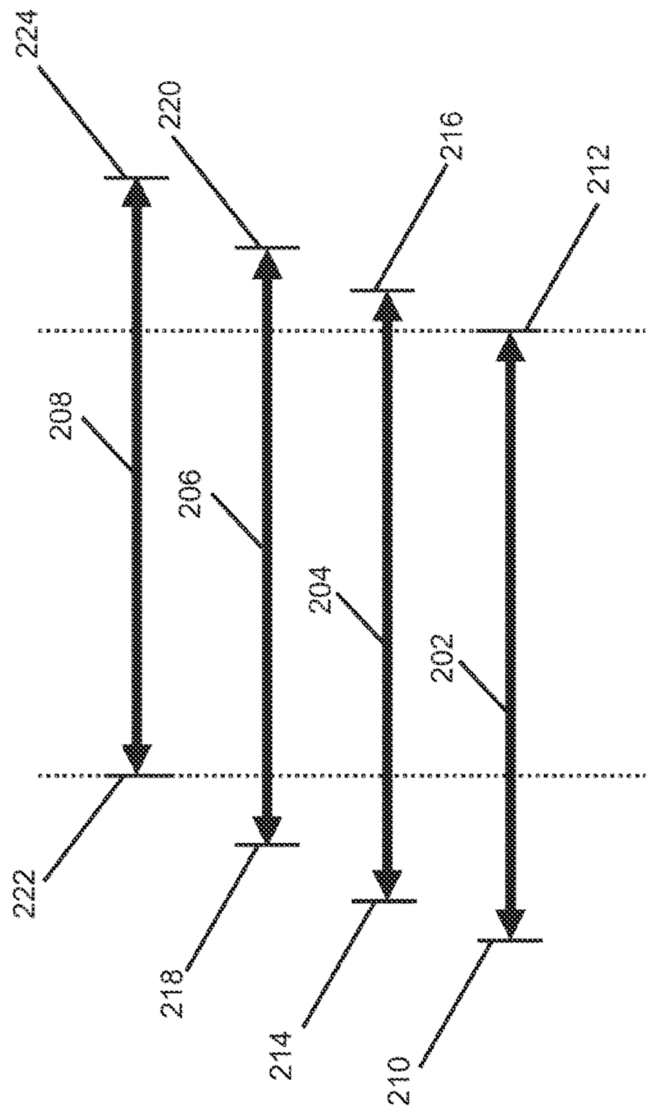
FIG. 2 illustrates ranges of light beam angles of light beams provided by the light fixture of FIG. 1 according to an example embodiment.

FIG. 2 illustrates ranges of light beam angles of the light beams 168-174 provided by the light fixture 100 of FIG. 1 according to an example embodiment. Referring to FIGS. 1 and 2, in some example embodiments, a range 202 of the beam angle of the light beam 168 may extend from a narrowest beam angle value 210 to a widest beam angle value 212. For example, the narrowest beam angle value 210 may be 3 degrees, and the widest beam angle value 212 may be 53 degrees. A range 204 of the beam angle of the light beam 170 may extend from a narrowest beam angle value 214 to a widest beam angle value 216. For example, the narrowest beam angle value 214 may be 5 degrees, and the widest beam angle value 216 may be 55 degrees. A range 206 of the beam angle of the light beam 172 may extend from a narrowest beam angle value 218 to a widest beam angle value 220. For example, the narrowest beam angle value 218 may be 7 degrees, and the widest beam angle value 220 may be 57 degrees. A range 208 of the beam angle of the light beam 174 may extend from a narrowest beam angle value 222 to a widest beam angle value 224. For example, the narrowest beam angle value 222 may be 10 degrees, and the widest beam angle value 224 may be 60 degrees.

In some example embodiments, the variations in the ranges 202-208 of light beam angles of the light beams 168-174 may be a result of differences in the die sizes of the LEDs that emit different color lights. For example, the die size of an LED that emits a red light may be larger than the die sizes of LEDs that emit green or blue lights. In some embodiments, the phosphor area in a phosphor converted white light LED may be larger than the die sizes of LEDs that emit green, blue, or red lights. To illustrate, although the secondary optics 146 and 158 may have the same light distribution characteristics, the narrowest beam angle value 210 may be smaller than the narrowest beam angle value 222 because the die size of the LED 144 (e.g., a green light LED) is smaller than the phosphor of the LED 156, which may be a phosphor converted white light LED. As described above, the light beam 168 may be a combination the lights that are emitted by the LEDs 144, 148, 152 and that passed through the respective one of the secondary optics 146, 150, 154, and the light beam 170 may be a combination the lights that are emitted by the LEDs 156, 160, 164 and that passed through the respective one of the secondary optics 158, 162, 166.

In some example embodiments, the processor 114 of the controller 110 may control the light beams 168-174 such that none of the beam angles of the light beams 168-174 are smaller than the narrowest beam angle value 222 of the range 208 and such that none of the beam angles of the light beams 168-174 are larger than the widest beam angle value 212 of the range 202. The processor 114 of the controller 110 may also control the light beams 168-174 such that the beam angles of the light beams 168-174 have the same value within a range bound by the smallest of narrowest beam angle values 210, 214, 218, 222 and the largest of the widest beam angle values 212, 216, 220, 224.

Figure 3B:
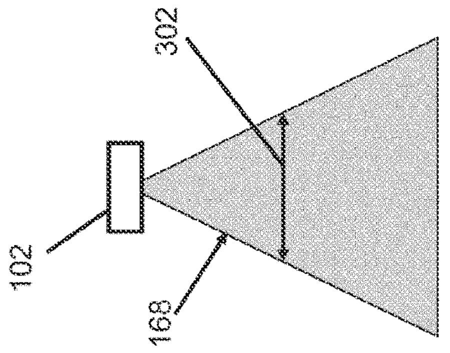
FIGS. 3A and 3B illustrate a light beam provided by a cluster of LED-optics units according to an example embodiment
Figure 3A:
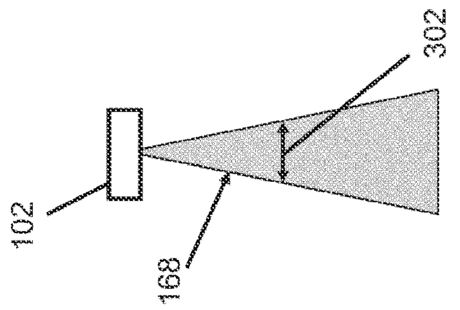

In some example embodiments, the limits of the ranges 202-208 of the beam angles of the light beams 168-174 may depend on the lights provided by the individual LED-optics units of the clusters of LED-optics units 102-108. To illustrate, FIGS. 3A and 3B show the light beam 168 provided by the cluster of LED-optics units 102 according to an example embodiment. In FIG. 3A, the light beam 168 is a relatively narrow beam, and in FIG. 3B, the light beam 168 is a relatively wide beam. Referring to FIGS. 1-3B, in some example embodiments, a beam angle 302 of the light beam 168 as shown in FIG. 3A may correspond to the narrowest beam angle value 210 of the beam angle 302 shown in FIG. 2, and the beam angle 302 of the light beam 168 as shown in FIG. 3B may correspond to the widest beam angle value 212 of the beam angle 302 shown in FIG. 2. In general, the beam angle 302 corresponds to the angle of the light beam 168 at which the intensity of the light beam 168 is at 50% percent of the maximum intensity of the light beam 168.

Figure 4:
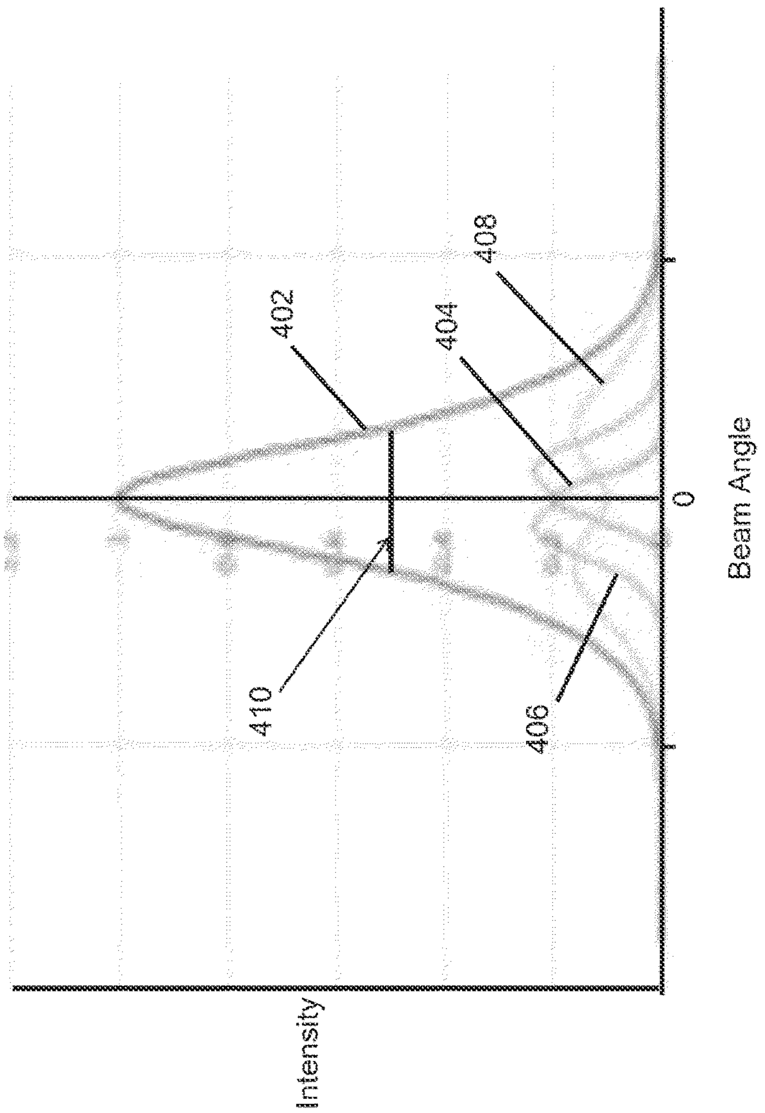
FIG. 4 illustrates intensity-beam angle curves of a light beam and constituent lights of the light beam according to an example embodiment.

In some example embodiments, the beam angle 302 of the light beam 168 may depend on the intensities of the lights emitted by the LED-optics units 118, 120, 122. To illustrate, FIG. 4 illustrates intensity-beam angle curves of the light beam 168 and the constituent lights of the light beam 168 according to an example embodiment. Referring to FIGS. 1-4, in some example embodiments, the light beam 168 may be an additive light beam that is a combination the lights provided by the LED-optics units 118, 120, 122. In FIG. 4, the curve 402 indicates the normalized intensity of the light beam 168. The curve 404 may correspond to the light provided by the LED-optics unit 118. The light provided by the LED-optics unit 118 is emitted by the LED 144 and provided through the secondary optics 146. The curve 406 may correspond to the light provided by the LED-optics unit 120. The light provided by the LED-optics unit 120 is emitted by the LED 148 and provided through the secondary optics 150. The curve 408 may correspond to the light provided by the LED-optics unit 122. The light provided by the LED-optics unit 122 is emitted by the LED 152 and provided through the secondary optics 154. As indicated above, the lights provided by the LED-optics units 118, 120, 122 may have the same color (e.g., green). That is, the lights provided by the LED-optics units 118, 120, 122 may have wavelengths corresponding to a green light.

In some example embodiments, the curve 402 is a normalized sum of the curves 404-408. For example, the secondary optics 146, 150, 154 may be designed such that the summing of the curves 404-408 produces the curve 402, which may be a Gaussian curve. The beam angle 302 of the light beam 168 shown in FIG. 3A may correspond to the full width half max of the curve 402. For example, the beam angle 302 may equal the full width half max value 410 of the curve 402. The full width half max value 410 and the shape of the curve 402 may be changed by changing one or more of the curves 404, 406, 408. For example, the narrowest beam angle value 210 of the beam angle 302 of the light beam 168 (i.e., the smallest value of the full width half max of the curve 402) may be achieved by turning off or significantly reducing the intensities of the lights provided by the LED-optics units 120, 122, which are represented by the curves 406, 408. As another example, the widest beam angle value 212 of the beam angle 302 of the light beam 168 may be achieved by turning off or significantly reducing the intensity of the light provided by the LED-optics unit 120, which corresponds to the curve 406, and by increasing the intensity of the light provided by the LED-optics unit 122, which corresponds to the curve 408. As yet another example, a beam angle value that is between the narrowest beam angle value 210 of the beam angle 302 and the widest beam angle value 212 of the beam angle 302 may be achieved by controlling the intensities of the lights provided by the LED-optics units 118, 120, 122, which respectively correspond to the curves 404, 406, 408, between intensities of the lights that result in the narrowest beam angle value 210 and the widest beam angle value 212.

Figure 5:
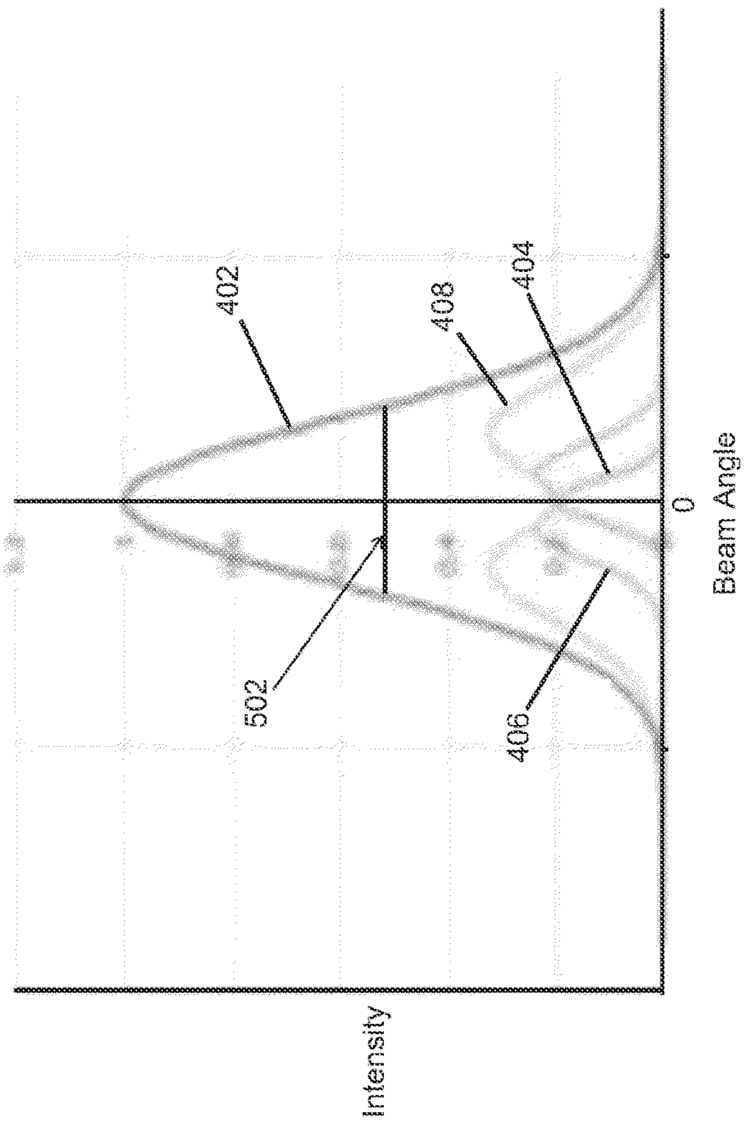
FIG. 5 illustrates intensity-beam angle curves of a light beam and constituent lights of the light beam according to another example embodiment.

For example, FIG. 5 illustrates intensity-beam angle curves of the light beam 168 and constituent lights of the light beam 168 according to another example embodiment. Referring to FIGS. 1-5, in some example embodiments, the curve 408 in FIG. 5 representing the intensity of the light provided by the LED-optics unit 122 has a larger area (i.e., more flux) than the curve 408 shown in FIG. 4. The larger area of the curve 408 shown in FIG. 5 results in the full width half max value 502 of the curve 402 in FIG. 5 being larger than the full width half max value 410 of the curve 402 in FIG. 4. The full width half max value 502 of FIG. 5 corresponds to a larger value of the beam angle 302 of the light beam 168.

In some example embodiments, the ratio of the areas under the curves 404-408 (i.e., ratios of the fluxes (e.g., 1:1.5:2) of the lights provided by the LED-optics units 118, 120, 122) may be used to adjust the intensities of the lights provided by the corresponding the LED-optics units 118, 120, 122. To illustrate, because the curves 404, 406, 408 each represent the intensity of the light provided by the respective one of the LED-optics units 118, 120, 122 relative to beam angle values, changing the intensity of one or more of the lights provided by the LED-optics units 118, 120, 122 can change the beam angle 302 of the light beam 168. Because the intensities of the lights provided by the LED-optics units 118, 120, 122 depend on the power provided by the driver 112 to the LED-optics units 118, 120, 122, the controller 110 of the light fixture 100 may control the current provided by the driver 112 to the LED-optics units 118, 120, 122 to control (e.g., increase or decrease) the beam angle 302 of the light beam 168. For example, the controller 110 may control the driver 112 to change the redistributing an amount of current among the LED-optics units 118, 120, 122 without changing the amount of the current. Alternatively, the controller 110 may control the driver 112 to change the current provided to one or more of the LED-optics units 118, 120, 122, which may result in a different total amount of the current being provided to the LED-optics units 118, 120, 122.

Because different ratios of the areas under the curves 404-408 may correspond to different values of the full width half max of the curve 402, which corresponds to the beam angle 302 of the light beam 168, the ratio of the areas under the curves 404-408 may be used to adjust the intensities of the lights provided by the corresponding the LED-optics units 118, 120, 122 to achieve a desired value of the beam angle 302 of the light beam 168. To illustrate, ratios of the areas under the curves 404-408 in association with respective values of the beam angle 302 of the light beam 168 (i.e., values of the full width half max) may be included in the lookup table 176 of the controller 110, and the controller 110 may use the ratios to control the current provided to the individual LED-optics units 118, 120, 122 to achieve the associated values of the beam angle of the light beam 168. For example, the processor 114 may use a desired beam angle value indicated by a user input to obtain from the lookup table 176 the ratio of the current to be provided to the individual LED-optics units 118, 120, 122 such that the beam angle 302 of the light beam 168 has the desired beam angle value. The areas under the curves 404-408 and associated values of the full width half max half of the curve 402 may be determined, for example, through calculation as can be readily understood by those of ordinary skill in the art with the benefit of this disclosure.

In some example embodiments, the intensities of the lights provided by the LED-optics units of the clusters of LED-optics units 104-108 may be represented by curves similar to the curves 404-406, and the intensities of the light beams 170-174 may be represented by curves similar to the curve 402 shown in FIGS. 4 and 5. To illustrate, in some example embodiments, the secondary optics of the LED-optics units of the clusters of LED-optics units 104-108 may have the same light distribution characteristics as corresponding ones of the secondary optics 146, 150, 154 of the LED-optics units 118, 120, 122 of the cluster of LED-optics unit 102. In some cases, differences in die sizes among different color light LEDs and/or use of phosphor converted LEDs may result in variations in the curves. For example, as indicated above, the lights provided by LEDs of the cluster of LED-optics unit 104 may be blue, the lights provided by LEDs of the cluster of LED-optics unit 106 may be red, and the lights provided by LEDs 156, 160, 164 of the cluster of LED-optics unit 108 may be phosphor converted white.

In some example embodiments, the ratios of areas under the curves with respect to intensities of the lights provided by the LED-optics units of the clusters of LED-optics units 104-108 may be used to control the beam angles of the light beams 170-174 in the manner described with respect to the light beam 168. For example, with respect to each light beam of the light beams 170-174, ratios of fluxes and associated beam angles may be stored in the lookup table 176. A beam angle value indicated by a user input may be used by the controller 110 to control current provided by the driver 112 to the respective LED-optics units of the clusters of LED-optics units 104-108 in the same manner as described with respect to the LED-optics units 118, 120, 122 of the cluster of LED-optics units 102.

In some example embodiments, by using the ratios and associated beam angle values included in the lookup up table 176, the processor 114 of the controller 110 may control the light beams 168-174 such that none of the beam angles of the light beams 168-174 are smaller than the narrowest beam angle value 222 of the range 208 and such that none of the beam angles of the light beams 168-174 are larger than the widest beam angle value 212 of the range 202. The processor 114 of the controller 110 may also control the light beams 168-174 such that the beam angles of the light beams 168-174 have the same value within a range bound by the narrowest beam angle value 222, which is the largest of narrowest beam angle values 210, 214, 218, 222, and by the widest beam angle value 212, which is the smallest of the widest beam angle values 212, 216, 220, 224.

By controlling the intensities of the respective lights that constitute the light beams 168-174, the beam angles of the light beams 168-174 may be controlled to match a beam angle value indicated by a user. By matching the beam angles of the light beams 168-174, a desired color of a light resulting from the combination of the light beams 168-174 may be uniformly achieved. By limiting the ranges of the beam angles of the light beams 168-174 by a minimum and maximum values achievable by all of the light beams 168-174, the light fixture 100 may provide the light beams 168-174 without unwanted colors at the perimeter of the overlapping light beams 168-174.

In some alternative embodiments, the light fixture 100 may include more or fewer clusters of LED-optics units than shown without departing from the scope of this disclosure. For example, the clusters of LED-optics units 104, 106 may be omitted without departing from the scope of this disclosure. As another example, the cluster of LED-optics units 104 may be omitted without departing from the scope of this disclosure. As another example, the light fixture 100 may include five clusters of LED-optics units. In some example embodiments, the clusters of LED-optics units 102-104 may be the same circuit board or two or more circuit boards without departing from the scope of this disclosure. In some alternative embodiments, each one of the clusters of LED-optics units 102-104 may include fewer or more LED-optics units than shown without departing from the scope of this disclosure. In some alternative embodiments, the light fixture 100 may include more or fewer components than shown in FIG. 1 without departing from the scope of this disclosure. In some alternative embodiments, the light fixture 100 may include different components than shown in FIG. 1 without departing from the scope of this disclosure. In some alternative embodiments, the light fixture 100 may include different configuration of components than shown in FIG. 1 without departing from the scope of this disclosure. In some alternative embodiments, instead of using the lookup table 176, the controller 110 may perform calculations to determine the distribution of current among the LED-optics units of each one of the clusters of the LED-optics units 102-108. In some alternative embodiments, the curves 402-408 shown in FIGS. 4 and 5 may have different shapes than shown without departing from the scope of this disclosure.

Figure 6A:
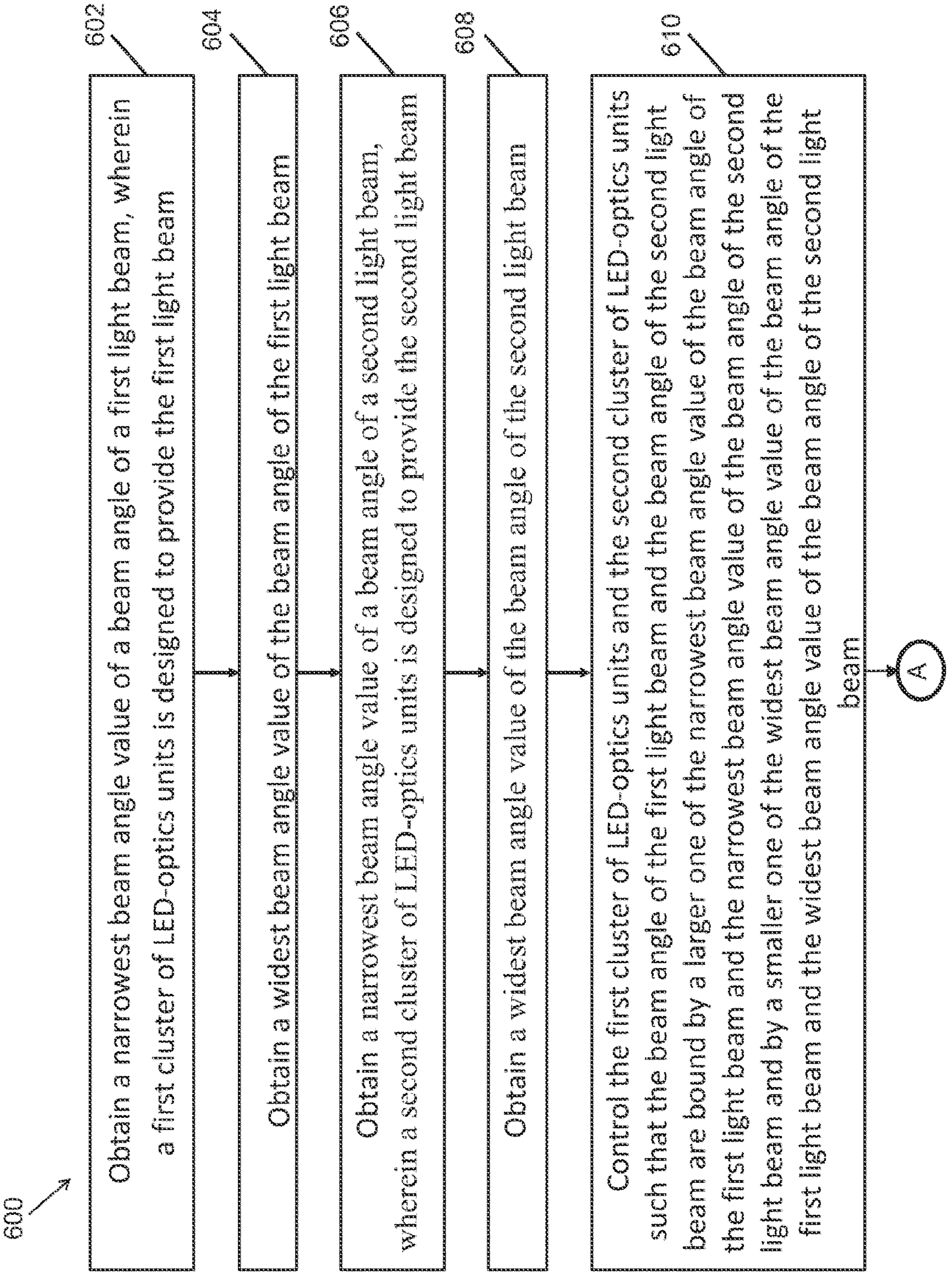
FIGS. 6A and 6B illustrate a method of controlling beam angles of light beams provided by the light fixture of FIG. 1 according to an example embodiment.
Figure 6B:
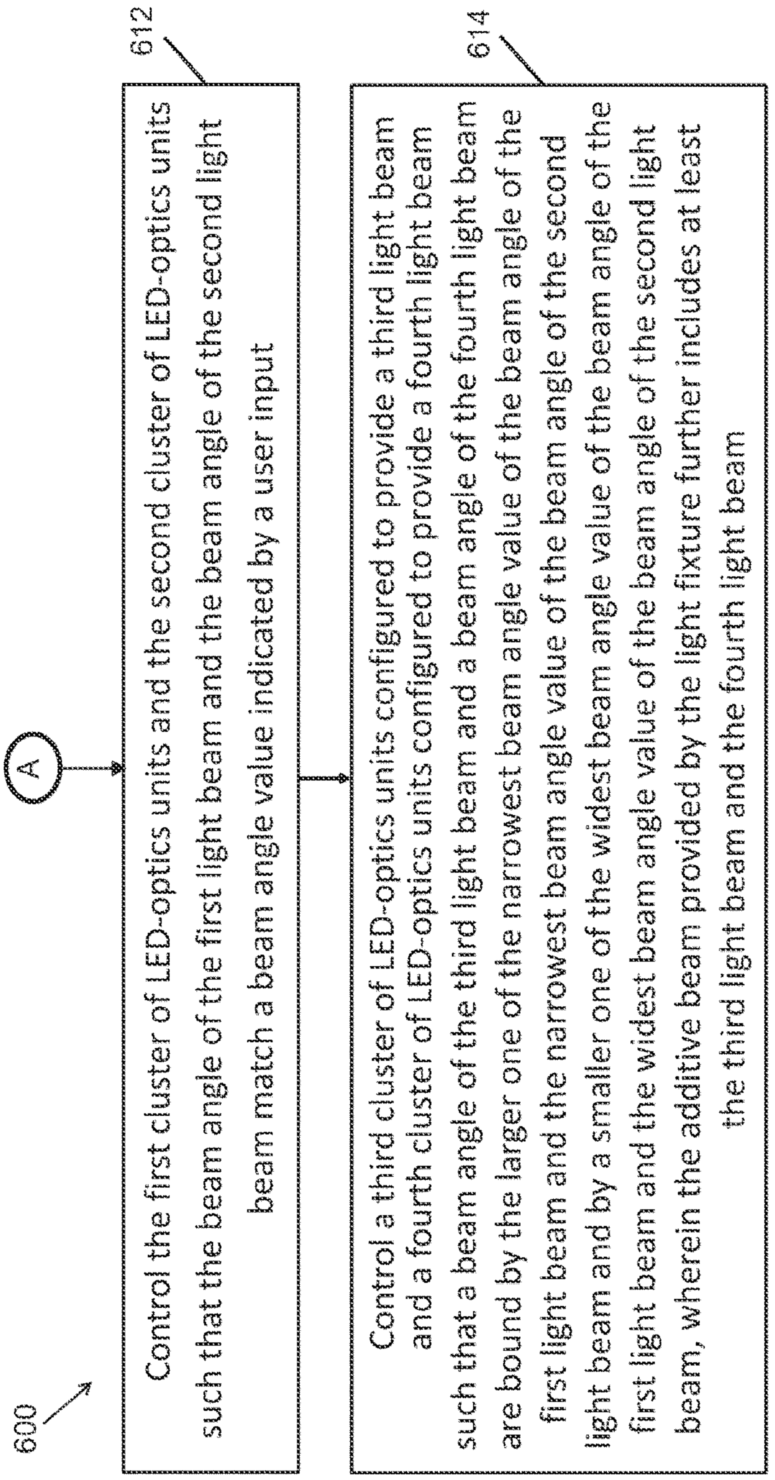

FIGS. 6A and 6B illustrate a method 600 of controlling beam angles of light beams 168-174 provided by the light fixture 100 of FIG. 1 according to an example embodiment. Referring to FIGS. 1-6B, in some example embodiments, the method 600 includes, at step 602, the method 600 may include obtaining, by the controller 110, the narrowest beam angle value 210 of a beam angle 302 of a first light beam 168. The first cluster of LED-optics units (e.g., the cluster of LED-optics units 102) is designed to provide the first light beam.

In some example embodiments, at step 604, the method 600 may include obtaining the widest beam angle value 212 of the beam angle 302 of the first light beam 168. For example, the narrowest beam angle value 210 of a beam angle 302 and the widest beam angle value 212 of the beam angle 302 may be determined by characterizing the light beam 168 as can be readily understood by those of ordinary skill in the art with the benefit of this disclosure. To illustrate, the narrowest beam angle value 210 and the widest beam angle value 212 may be stored in the memory device 116 of the controller 110 and may be obtained by the processor 114 from the memory device 116.

In some example embodiments, at step 606, the method 600 may include obtaining a narrowest beam angle value 222 of the beam angle of the second light beam 174. The second cluster of LED-optics units 108 is designed to provide the second light beam. At step 608, the method 600 may include obtaining the widest beam angle value 224 of the beam angle of the second light beam 174.

In some example embodiments, at step 610, the method 600 may include controlling, by the controller 110, the first cluster of LED-optics units 102 and the second cluster of LED-optics units 108 such that the beam angle 302 of the first light beam 168 and the beam angle of the second light beam 174 are bound by a larger one of the narrowest beam angle value 210 of the beam angle of the first light beam 168 and the narrowest beam angle value 222 of the beam angle of the second light beam 174 and by a smaller one of the widest beam angle value 212 of the beam angle of the first light beam 168 and the widest beam angle value 224 of the beam angle of the second light beam 174. For example, the processor 114 may use the ratio and related beam angle value information in the lookup table 176 to limit the narrowest angle value of the light beams 168, 174 to the narrowest angle value 222 of the light beam 174 shown in FIG. 2 and to limit the widest angle value of the light beams 168, 174 to the widest angle value 212 of the light beam 168 shown in FIG. 2.

To illustrate, beam angle values may be indicated by a user using, for example, DMX ("Digital Multiplex") values ranging from 0 to 255, and the controller may map the DMX values based on the DMX value of 0 corresponding to the narrowest angle value 222 and based on the DMX value of 255 corresponding to the widest angle value 212. To illustrate, upon receiving a user input indicating the smallest beam angle value (e.g., DMX value of 0), the controller 110 may control the current provided to the LED-optics units 118-122 based on the ratio associated with the narrowest angle value 222 in the lookup table with respect to the light beam 168. Upon receiving the user input indicating the smallest beam angle value, the controller 110 may also control the current provided to the LED-optics units 136-140 based on the ratio associated with the narrowest angle value 222 in the lookup table 176 with respect to the light beam 174. Upon receiving the user input indicating the smallest beam angle value, the controller 110 may also control the current provided to the LED-optics units 124-128 of the cluster of LED-optics units 104 based on the ratio associated with the narrowest angle value 222 in the lookup table 176 with respect to the light beam 170. Upon receiving the user input indicating the smallest beam angle value, the controller 110 may also control the current provided to the LED-optics units 130-134 of the cluster of LED-optics units 106 based on the ratio associated with the narrowest angle value 222 in the lookup table 176 with respect to the light beam 172.

Upon receiving a user input indicating the largest beam angle value (e.g., DMX value of 255), the controller 110 may control the current provided to the LED-optics units 118-122 based on the ratio associated with the widest angle value 212 in the lookup table with respect to the light beam 168. Upon receiving the user input indicating the largest beam angle value, the controller 110 may also control the current provided to the LED-optics units 136-140 based on the ratio associated with the widest angle value 212 in the lookup table 176 with respect to the light beam 174. Upon receiving the user input indicating the largest beam angle value, the controller 110 may also control the current provided to the LED-optics units 124-128 of the cluster of LED-optics units 104 based on the ratio associated with the widest angle value 212 in the lookup table 176 with respect to the light beam 170. Upon receiving the user input indicating the largest beam angle value, the controller 110 may also control the current provided to the LED-optics units 130-134 of the cluster of LED-optics units 106 based on the ratio associated with the widest angle value 212 in the lookup table 176 with respect to the light beam 172.

As indicated by the off-page connector A in FIGS. 6A and 6B, in some example embodiments, at step 612, the method 600 may include controlling, by the controller 110, the first cluster of LED-optics units 102 and the second cluster of LED-optics units 104 such that the beam angle 302 of the first light beam 168 and the beam angle of the second light beam 174 match a beam angle value indicated by a user input. As indicated above, the controller 110 may use ratio and related beam angle value information in the lookup table 176 to control the current provided to the LED-optics units 118-122 of the cluster of LED-optics units 102 and the current provided to the LED-optics units 136-140 of the cluster of LED-optics units 108.

In some example embodiments, at step 614, the method 600 may include controlling the third cluster of LED-optics units 104 that provides the light beam 170 and the fourth cluster of LED-optics units 106 that provides the light beam 172 such that the beam angle of the third light beam 170 and the beam angle of the fourth light beam 172 are bound by the larger one of the narrowest beam angle value 210 of the beam angle of the first light beam 168 and the narrowest beam angle value 222 of the beam angle of the second light beam 174 and by the smaller one of the widest beam angle value 212 of the beam angle of the first light beam 168 and the widest beam angle value 224 of the beam angle of the second light beam 174.

In some alternative embodiments, the method 600 may include more or fewer steps than shown without departing from the scope of this disclosure. In some alternative embodiments, the steps of the method 600 may be performed in a different order than shown without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

The invention claimed is:

1. A method of controlling light beam angles of light beams provided by a light fixture, the method comprising:

obtaining, by a controller, a narrowest beam angle value of a range of a beam angle of a first light beam and a widest beam angle value of the range of the beam angle of the first light beam, wherein a first cluster of LED-optics units is designed to provide the first light beam;

obtaining, by the controller, a narrowest beam angle value of a range of a beam angle of a second light beam and a widest beam angle value of the range of the beam angle of the second light beam, wherein a second cluster of LED-optics units is designed to provide the second light beam; and controlling, by the controller, the first cluster of LED-optics units and the second cluster of LED-optics units such that the beam angle of the first light beam and the beam angle of the second light beam are bound by a larger one of the narrowest beam angle value of the range of the beam angle of the first light beam and the narrowest beam angle value of the range of the beam angle of the second light beam and by a smaller one of the widest beam angle value of the range of the beam angle of the first light beam and the widest beam angle value of the range of the beam angle of the second light beam.

2. The method of claim 1, further comprising controlling the first cluster of LED-optics units and the second cluster of LED-optics units such that the beam angle of the first light beam and the beam angle of the second light beam match a beam angle value indicated by a user input.

3. The method of claim 2, wherein a color of the first light beam is different from a color of the second light beam.

4. The method of claim 2, wherein an LED-optics unit of the first cluster of LED-optics units includes a first LED and a first secondary optics, wherein an LED-optics unit of the second cluster of LED-optics units includes a second LED and a second secondary optics, and wherein the first secondary optics and the second secondary optics have same first light distribution characteristics.

5. The method of claim 4, wherein a second LED-optics unit of the first cluster of LED-optics units includes a third LED and a third secondary optics, wherein a second LED-optics unit of the second cluster of LED-optics units includes a fourth LED and a fourth secondary optics, and wherein the third secondary optics and the fourth secondary optics have same second light distribution characteristics that are different from the first lighting distribution characteristics.

6. The method of claim 5, wherein the beam angle of the first light beam depends on an intensity of a light emitted by the first LED and an intensity of a light emitted by the third LED and wherein the beam angle of the second light beam depends on an intensity of a light emitted by the second LED and an intensity of a light emitted by the fourth LED.

7. The method of claim 1, wherein the first cluster of LED-optics units comprises first three LED-optics units, wherein the second cluster of LED-optics units comprises second three LED-optics units, wherein each LED-optics unit of the first three LED-optics units comprises a first LED and a first secondary optics, wherein the first light beam comprises first lights having a first color and emitted by the first LEDs of the first three LED-optics units, wherein each LED-optics unit of the second three LED-optics units comprises a second LED and a second secondary optics, and wherein the second light beam comprises second lights having a second color and emitted by the second LEDs of the second three LED-optics units.

8. The method of claim 7, wherein each first secondary optics has same light distribution characteristics as a respective one of the second secondary optics.

9. The method of claim 1, further comprising controlling a third cluster of LED-optics units configured to provide a third light beam and a fourth cluster of LED-optics units configured to provide a fourth light beam such that a beam angle of the third light beam and a beam angle of the fourth light beam are bound by the larger one of the narrowest beam angle value of the range of the beam angle of the first light beam- and the narrowest beam angle value of the range of the beam angle of the second light beam and by the smaller one of the widest beam angle value of the range of the beam angle of the first light beam and the widest beam angle value of the range of the beam angle of the second light beam.

10. A light fixture, comprising:

a first cluster of LED-optics units designed to provide a first light beam;

a second cluster of LED-optics units designed to provide a second light beam; and a controller configured to:

obtain a narrowest beam angle value of a range of a beam angle of the first light beam and a widest beam angle value of the range of the beam angle of the first light beam;

obtain a narrowest beam angle value of a range of a beam angle of the second light beam and a widest beam angle value of the range of the beam angle of the second light beam; and control the first cluster of LED-optics units and the second cluster of LED-optics units such that a beam angle of the first light beam and a beam angle of the second light beam are bound by a larger one of a narrowest beam angle value of the range of the beam angle of the first light beam- and a narrowest beam angle value of the range of the beam angle of the second light beam and by a smaller one of a widest beam angle value of the range of the beam angle of the first light beam and a widest beam angle value of the range of the beam angle of the second light beam.

11. The light fixture of claim 10, wherein the controller is further configured to control the first cluster of LED-optics units and the second cluster of LED-optics units such that the beam angle of the first light beam and the beam angle of the second light beam match a beam angle value indicated by a user input.

12. The light fixture of claim 11, wherein a color of the first light beam is different from a color of the second light beam.

13. The light fixture of claim 11, wherein an LED-optics unit of the first cluster of LED-optics units includes a first LED and a first secondary optics, wherein an LED-optics unit of the second cluster of LED-optics units includes a second LED and a second secondary optics, and wherein the first secondary optics and the second secondary optics have same first light distribution characteristics.

14. The light fixture of claim 13, wherein a second LED-optics unit of the first cluster of LED-optics units includes a third LED and a third secondary optics, wherein a second LED-optics unit of the second cluster of LED-optics units includes a fourth LED and a fourth secondary optics, and wherein the third secondary optics and the fourth secondary optics have same second light distribution characteristics that are different from the first light distribution characteristics.

15. The light fixture of claim 14, wherein the beam angle of the first light beam depends on an intensity of a light emitted by the first LED and an intensity of a light emitted by the third LED and wherein the beam angle of the second light beam depends on an intensity of a light emitted by the second LED and an intensity of a light emitted by the fourth LED.

* * * * *